G. B. GROVER.
HEEL COMPRESSING MACHINE.
APPLICATION FILED JUNE 14, 1905.

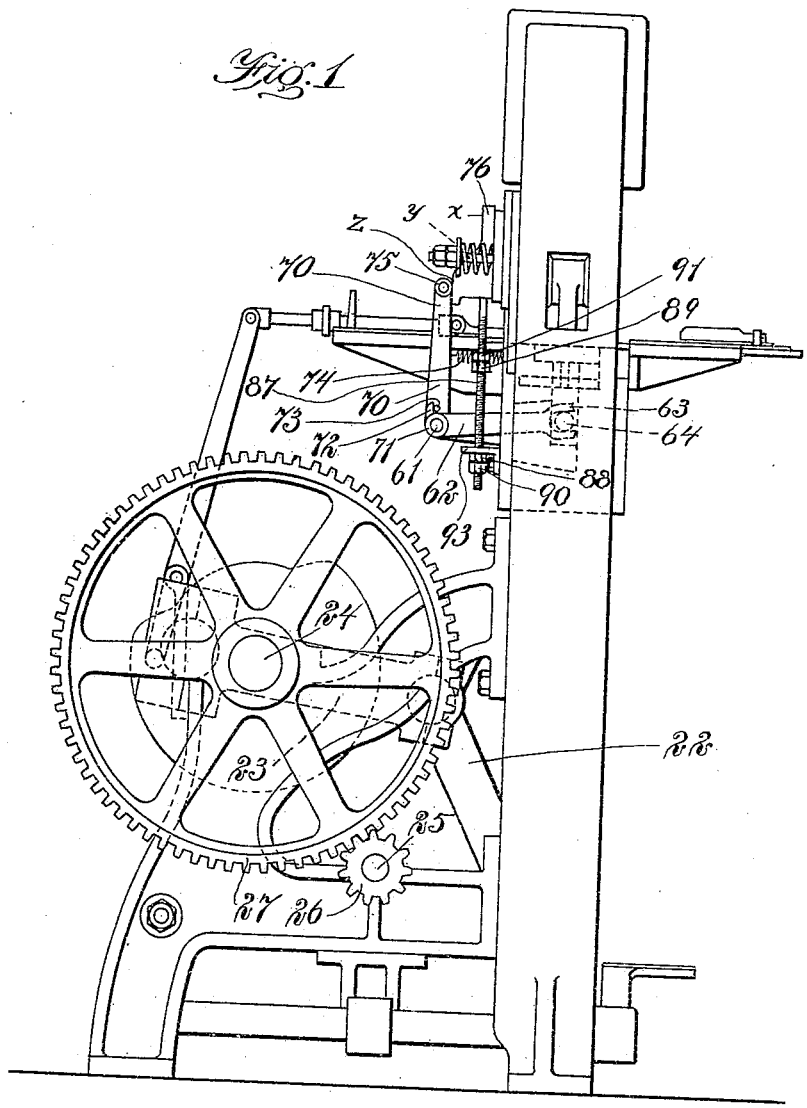

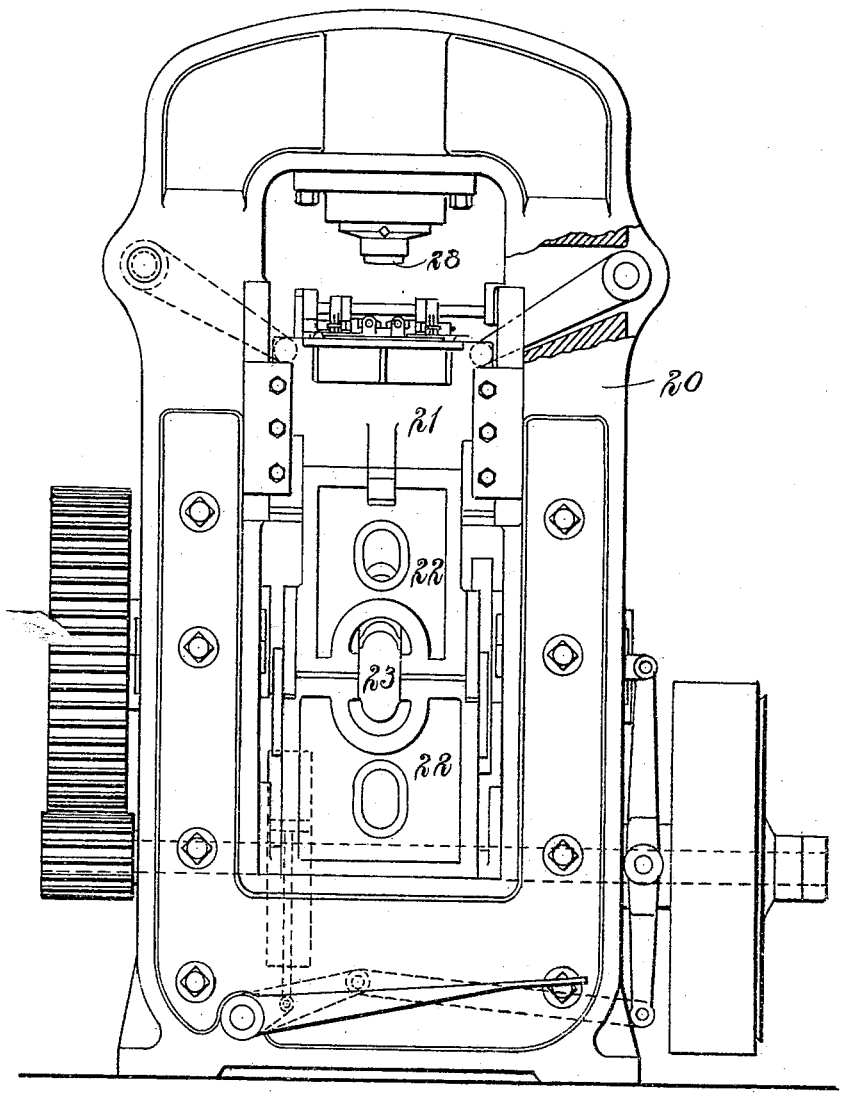

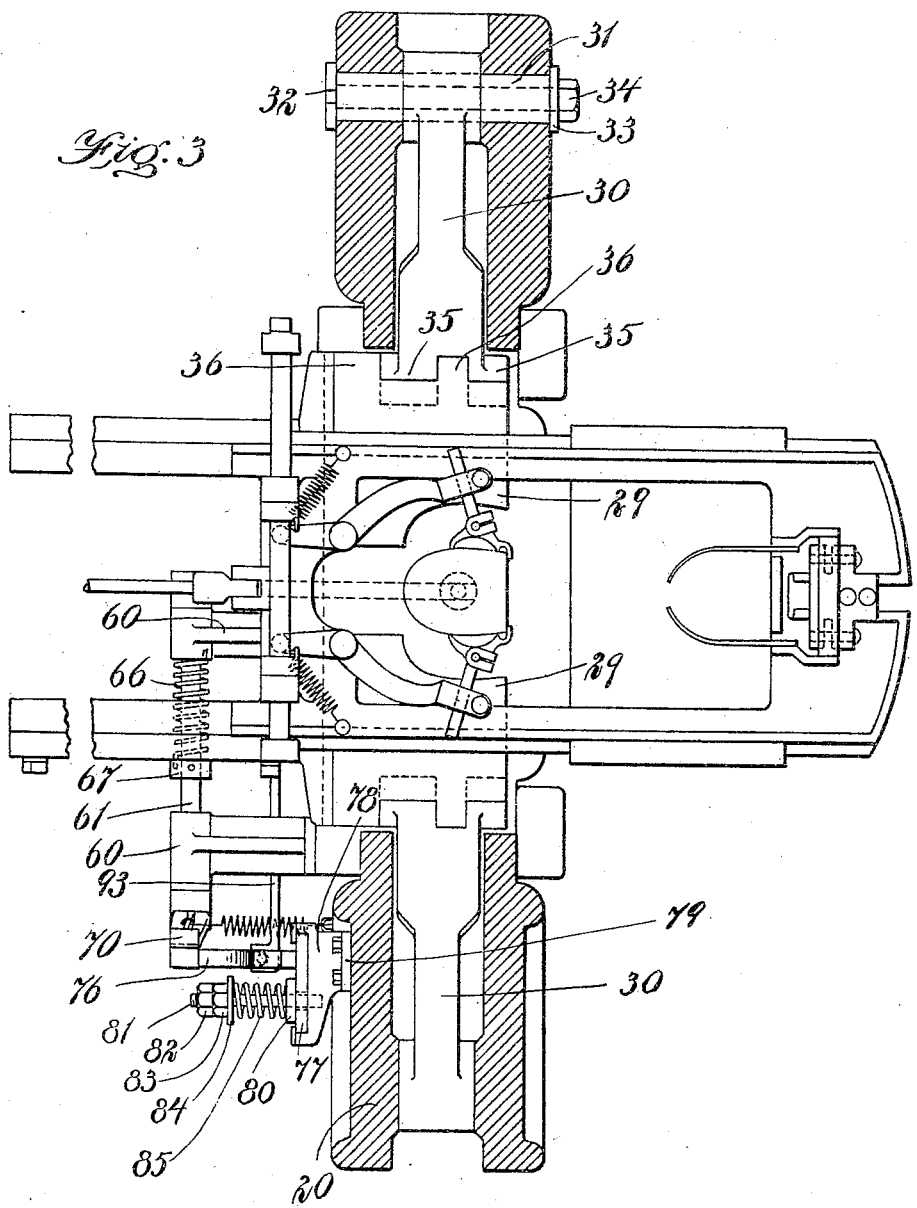

939,686.

Patented Nov. 9, 1909.
4 SHEETS—SHEET 4.

Witnesses:
C. C. Stecher
F. D. Sweet

Inventor
George B. Grover
by
Wright Brown Quinby May
Attorneys

UNITED STATES PATENT OFFICE.

GEORGE B. GROVER, OF LYNN, MASSACHUSETTS, ASSIGNOR TO W. J. YOUNG MACHINERY COMPANY, OF LYNN, MASSACHUSETTS, A CORPORATION OF MASSACHUSETTS.

HEEL-COMPRESSING MACHINE.

939,686.  Specification of Letters Patent.  Patented Nov. 9, 1909.

Application filed June 14, 1905. Serial No. 265,195.

*To all whom it may concern:*

Be it known that I, GEORGE B. GROVER, of Lynn, in the county of Essex and State of Massachusetts, have invented certain new and useful Improvements in Heel-Compressing Machines, of which the following is a specification.

This invention has relation to machines for compressing heels and has for its object to provide certain improvements upon machines such as that illustrated in Letters Patent No. 628,513, granted to William J. Young July 11th, 1899. In the machine of that patent are employed a die and a mold, the latter being reciprocated by a head toward and from the die. The mold comprises side dies, which as the head moves toward the die are brought together to laterally compress a heel blank placed between them and which separate as the head descends. The blanks are fed automatically to the mold, which is provided with an ejector consisting of a top-lift plate which normally forms the bottom of the mold, and a pin or post to which the plate is attached, mechanism being provided for moving the ejector relatively to the mold during the up and down movement of the head, to eject a finished heel from the mold and to receive a blank.

One of the objects of the present invention is to provide an improved mechanism for automatically operating the ejector, by means of which the finished heel may be removed from the mold during the latter half of the downward movement of the head and mold when the side dies are separated, and the ejector may be lowered to permit a blank to be placed in proper position for molding during the first half of the upward movement of the mold and head toward the die. I find this to be a desideratum in machines of the character mentioned, since it enables the finished heel and the blank to be severally ejected and received in proper position when the side dies are farthest separated and inactive.

Another object of the invention is to provide an improved means for effecting an adjustment of the side-dies without weakening the rigidity of the operating links and their connections with the dies and the frame.

A still further object is to provide an improved device for detachably securing the top-lift plate to the post or stem by which it is operated.

Figure 5:
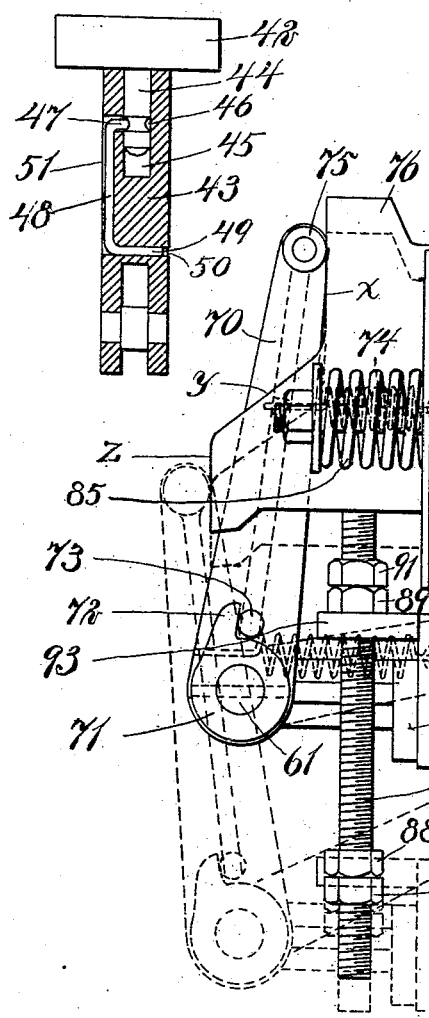
Figure 4:
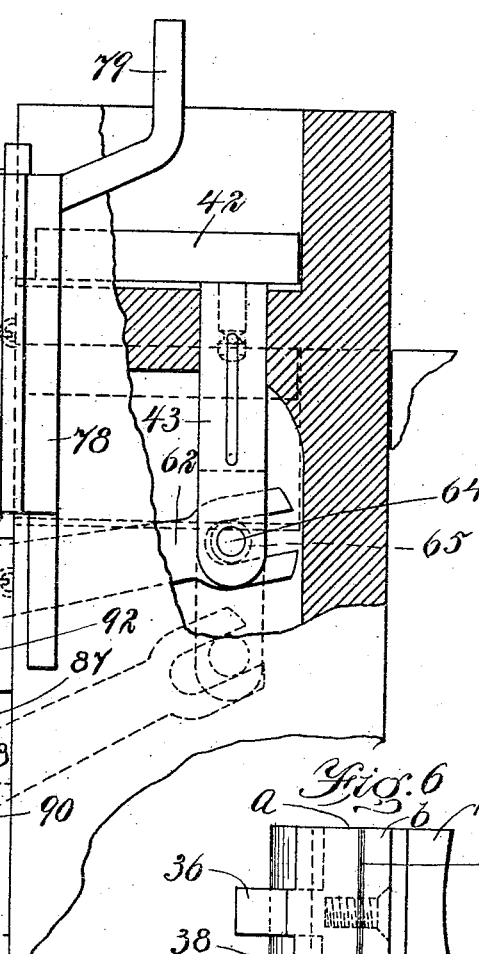
Figure 6:
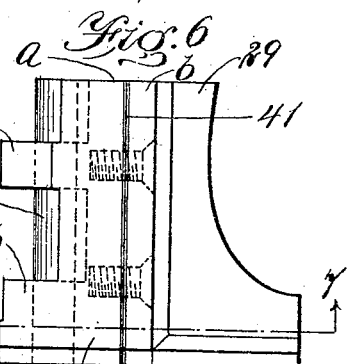
Figure 8:
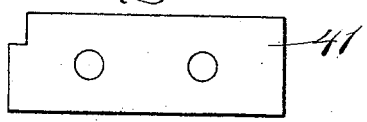
Figure 7:
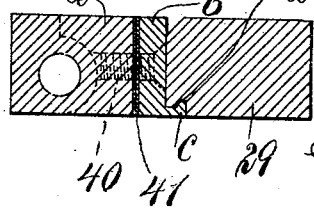

Referring to the accompanying drawings,— Figure 1 represents in side elevation a machine embodying the invention. Fig. 2 represents a front elevation thereof. Fig. 3 represents the machine in horizontal section. Fig. 4 shows in detail the ejector operating mechanism. Fig. 5 is a detail view illustrating the means by which the top-lift plate is detachably connected to its post or stem. Fig. 6 represents one of the side dies in plan view. Fig. 7 represents a section on the line 7—7 of Fig. 6. Fig. 8 represents one of the removable adjustable spacers or shims by which the side dies are adjusted with relation to the links.

Referring to the accompanying drawings,—20 indicates a frame in which the head 21 is reciprocated by toggle-levers 22 connected at their knuckle, by a link 23, with a crank on the crank-shaft 24. This crank-shaft is driven from a main power shaft 25 by a pinion 26 and gear 27. The shaft 24 carries a cam for operating the mechanism by which the blanks are fed to the compressing mechanism and the finished heels are removed therefrom. In the upper portion of the frame is adjustably secured the heel seat die 28 with which coöperates the mold on the movable head 21. The mold on the head comprises side-compressing dies 29 29 which are movable toward and from each other, as the head rises and falls, by pivoted arms or links 30 30. The outer ends of the links are fulcrumed or pivoted on hollow shafts or bars 31 which are located in apertures in the frame and held in place by a bolt 32, washer 33, and nut 34. The shaft or bar 31 and the bolt 32 are eccentric, the bar being made relatively large in diameter, so as to afford a rigid abutment to resist the outward thrust of the links.

One of the side dies 29 is illustrated in Figs. 6 and 7, which figures also illustrate the devices for attaching the side dies to the said links. It will be observed that the inner ends of the link are formed with ears 35 35 which alternate with ears 36 36 in the slide 37. These ears 35 36 have alined apertures and the slide 37 is formed to receive the convex portion of the ears 35, as shown in Fig. 7. The pintle or pin 38 is passed through the apertures in the ears 35 36 to connect the slide and the link together. The slide is vertically divided into two sections indicated at *a* and *b*, which are secured together by screws 40, the heads of which lie in countersunk apertures in the inner face of the section *b*. The section *b* and the side die 29 are formed with complemental interlocking tongues and grooves, *c d*, which permit the side die to be detached by lifting it vertically and yet which will cause the side die to move with its slide when the slide is reciprocated by the link to which it is connected.

The outer face of the die bears rigidly against the inner face of the slide, whereas the outer face of the slide abuts directly against the end of the link or against the pintle 38 which connects it thereto so that there are no threaded parts interposed between the side dies and the bars 31 upon which the links are fulcrumed, or to which they are pivoted. Consequently there is no danger of any of the parts yielding under severe strain. It is highly desirable, however, that there should be some means for adjusting the side dies relatively to the links, in order to compensate for wear or to adjust the dies in accordance with the width of the heel to be compressed. Therefore the slide is divided into two sections *a* and *b*, as described, so that they may be spread by partially removing the screws 40 for the insertion of interchangeable shims or spacers between them. One of these shims or spacers is indicated at 41 in Fig. 8. It will be understood that they are all different thicknesses and therefore a shim of proper thickness may be utilized for interposition between the sections *a* and *b* to adjust the side dies with the greatest accuracy with relation to each other. The employment of a solid shim permits no yielding of the parts and obviates the employment of threads with the danger of stripping them.

The bottom of the mold is formed of a top-lift plate 42 which is capable of movement relatively to the mold. It is adapted to normally rest in the mold upon the cross-head, and since its flat end rests against the front wall of the mold, it is incapable of rotation. This plate is detachably secured to a post 43, which is adapted to be vertically reciprocated, as will be subsequently explained.

The top-lift or tread-plate 42 has a depending stem 44, which is adapted to be rotatively inserted in a socket 45 in the upper end of the post 43, the stem and the socket being cylindrical. The stem has a peripheral groove 46 with which may be engaged the inwardly bent end 47 of a spring 48, the other end 49 of which is bent parallel to the end 47, and is inserted in a transverse aperture 50 in the post. The body of the spring 48 lies in a groove 51 extending longitudinally of the post so that it is sunk below the periphery of said post. The extremity of the stem 44 is beveled so that when it is inserted into the socket 45, it forces the free end 47 of the spring outward until the peripheral groove 46 registers therewith, after which the spring holds the stem and therefore the plate 42 against accidental detachment. The groove 46 is concave, as shown, so that the end 47 of the spring will be wedged upward when the plate 42 is withdrawn. The spring provides an automatic latch for locking the tread or top-lift plate to the post when the stem is inserted into the socket in the post and the device requires no manual adjustment or manipulation of the spring-latch to secure the tread-plate to the post.

The plate 42 and the post 43 constitute an ejector for removing a finished heel from the mold, and they are operated automatically to eject the finished heel after the side dies have become separated to a considerable extent, so that the heel has been entirely released by them. The mechanism therefore is so arranged and timed that the ejector is not moved relatively to the mold, until the cross-head has traversed the first half of its movement away from the die 28. In order, however, that the ejector may soon descend into its normal position, to bring a blank into proper operative relation to the side dies, I provide for the ejector being quickly lowered during the first part of the upward movement of the mold and head. The automatic mechanism by which this is accomplished will now be described. Attached to the rear portion of the head are two brackets 60 60 in which is journaled a rock-shaft 61. At one end this rock-shaft has rigidly secured upon it an arm or lever 62, the end of which is yoke-shaped or bifurcated as at 63, to engage a pin 64 extending transversely or laterally from the lower end of the post 43. Preferably a roll 65 is mounted upon the pin 64 and is located in the slot formed in the bifurcated end of the lever 62. A spring 66 encircles the shaft 61, one end being attached to one of the brackets 60 and the other to a collar 67 pinned to the shaft 61. The function of this spring is to rock the shaft to move the arm 62 downwardly, and thus tend constantly to seat the plate 42 in the bottom of the mold. In order to rock said shaft 61 and thus effect the automatic operation of the ejector, *i. e.*,—the plate 42 and post 43,—a power transmitter, which in the present case consists of an arm 70 is placed loosely on the other end of the shaft 61 and is located at substantially right angles to the arm 62. The said arm is held against axial movement, being located between one of the brackets 60 and a collar 71 which is pinned to the shaft 61. The said collar 71 has a lug or projection 72 which is engaged with a pin 73 projecting laterally from the arm 70. The free end of the arm 70 is connected by a tension spring 74 with the head, as shown in dotted lines in Fig. 4. Upon the extremity of the arm or power transmitter 70, which is thus operatively connected to the ejector, is a roll 75 which is adapted to rest upon a cam 76 supported by the frame 20. The operative edge of this cam has two substantially parallel faces $x$ and $z$, and an inclined connecting portion or face $y$. The portions $x$ and $y$ are substantially parallel to the line of movement of the head, so that during the reciprocation of the head, the arm 70 is rocked or moved only while the roll 75 is in engagement with the portion $y$ of the cam. The portion $x$ of the cam is longer than the portion $z$, so that when the cam is in the full line position in Fig. 4, the head descends during the first half of its downward movement before the roll 75 engages the portion $y$ of the cam face. As soon as the roll 75, during the downward movement of the head, rides out over the portion $y$, the pin 73 engages the lug 72 on the collar 71 and rocks the shaft 61 so as to lift the post 43 and the plate 42 to bring the upper face of the plate flush with the top of the head to permit of the removal of the finished heel, and hence the altitude of the inclined portion $y$ is sufficient to cause the arm 70 to impart the proper length of movement to the head 42.

In order that the ejector or plate 42 may be dropped to its normal position when the head first begins its upward movement, and as soon as a blank has been placed upon said plate by the feeding mechanism, I provide for automatically moving the cam relatively to the frame on which it is mounted, so that when the head first starts upwardly, the roll 75 will ride in on the portion $y$ of the cam face. This is accomplished by mounting the cam 76 upon a slide 77 which is adapted to vertically reciprocate in a groove in a guideway 78 having a bracket 79, (see Fig. 4) by which it is attached to one face of the frame 20, (see Fig. 3). Suitable fastening devices are passed through the bracket into the frame to hold it securely in place.

The slide 77 is gibbed on the guideway 78 and it is held frictionally against movement relatively thereto by a friction-plate 80. A pin 81 extends outward from the guideway through an elongated slot in the slide, and on its ends are nuts 82 and 83 and a washer 84. Between the washer 84 and the plate 80 is placed a spring 85, to hold the friction plate against the slide.

Depending from the cam 76 is a stop-carrier consisting of a threaded bar 87 provided with separated stops consisting of adjustable nuts 88 and 89. The nuts 90 and 91 are utilized to lock the stops 88 and 89 in any position to which they may be adjusted. To the head is attached a bracket 92 carrying a bar or actuator 93 whose end is apertured or slotted to receive a stop-carrier 87, but in position to engage the stops 88 89 alternately as the head reciprocates. By reason of this construction when the head is approaching its lower extreme of movement, the bar or actuator 93 engages the stop 88 and carries the cam 76 downward from the full line position in Fig. 4 to the dotted line position, but this movement does not occur until after the roll 75 has reached the portion $z$ of the face of the cam, and the head 42 has reached the dotted-line position in Fig. 4. Hence when the head begins its upward movement, the cam will remain stationary, so that the roll will ride in along the portion $y$ of the cam to permit the ejector to drop during the first half of the upward movement of the head and when said head has reached its upward extreme of movement, the actuator 93 will engage the stop 89 and move the cam from the dotted line position in Fig. 4 to the full line position.

From this description, it will be apparent that the movement of the ejector will take place first upward and then downward, unless when the head is at or below a point midway between its extremes of movement, and yet the dropping of the ejector takes place when the head is at a plane below the plane at which the ejector is raised during the downward movement of the head.

Any suitable feeding mechanism may be utilized to feed the blank to the mold and to remold the finished or compressed heel, and I have upon the drawings illustrated one form of such mechanism, but I shall not describe it, as it is illustrated, described in detail, and claimed in said Letters Patent to Young, No. 628,513, to which reference may be had. The cam for operating the feeding mechanism, however, although conventionally shown, is properly timed to cause said feeding mechanism to accurately coöperate with the ejector.

It should be pointed out that inasmuch as the stops on the cam are adjustable relatively to the actuator, it enables me to effect an adujstment of the cam and power transmitter or lever relatively to each other, so that I can vary the timing of the operation of the top-lift plate. Hence I can vary the points in the travel of the head, at which the said plate is caused to rise or to drop relatively to the mold.

Having thus explained the nature of the invention, and described a way of constructing and using the same, although without attempting to set forth all of the forms in which it may be made, or all of the modes of its use, I declare that what I claim is:—

1. In a compressing machine, a die and a coöperating mold movable toward and from said die, an ejector in said mold and movable relatively thereto, and means comprising a cam and connections between the cam and the ejector for causing said ejector to rise in the mold during the last half of the descent of the mold, and to drop during the first half of the ascent of said mold.

2. In a compressing machine, a mold comprising side dies adapted to separate and receive a blank, and then to close and compress said blank, a movable ejector in said mold normally at the bottom thereof, means for actuating said dies, and means comprising a bodily movable cam and connections between the cam and the ejector for raising and lowering said ejector while the dies are opened approximately to their fullest extent.

3. In a compressing machine, a frame, a reciprocating head, a heel-seat die, a top-lift plate adapted to sustain a blank and movably mounted on said head, said head and top-lift plate being movable toward and from said die, and mechanism including a lever and a cam bodily movable in the frame for operating said lever to lift said plate during the latter half of the movement of the head away from said die.

4. In a compressing machine, a frame, a reciprocating head, a heel-seat die, a top-lift plate adapted to sustain a blank and movably mounted on said head, said head and top-lift plate being movable toward and from said die, and mechanism including a lever and a cam bodily movable on the frame for lifting said plate during the latter half of the movement of the head away from said die and lowering said plate during the first portion of the motion of said head toward said die.

5. A compressing machine comprising a mold, a coöperating die, means for relatively moving said mold and die, and an independently movable plate normally forming the bottom of the mold, combined with means including a lever and a cam movable with the head for causing said plate first to move with said mold away from the die, and then to ascend relatively to the mold during the last half of the movement of the mold.

6. A compressing machine comprising a mold, a coöperating die, means for relatively moving said mold and die, and an independently movable plate normally forming the bottom of the mold, combined with means including a lever and a cam movable with the head for causing said plate first to move with said mold away from the die, and then to ascend relatively to the mold during the last half of the movement of the mold, and then to descend relatively to the mold during a portion of the first ascending movement of the mold toward the die and to ascend with said mold during the remainder of the ascending movement of said mold toward the die.

7. In a compressing machine, a reciprocating head, a mold carried by said head, an ejector carried by said mold, and instrumentalities for causing the operation of said ejector comprising an actuating cam relatively to which said head is movable, and means for causing said cam to move bodily with said head during a portion of the movement thereof and remain stationary during the remainder of the movement thereof.

8. In a compressing machine, a reciprocating head, a mold carried by said head, a top-lift plate and instrumentalities for causing said top-lift plate to be moved relatively to the mold comprising a cam, a cam-operated lever movable with the head and connected to said plate, and means for causing said cam to remain stationary during a part of the upward movement of the head and to move with said head during the remainder of said movement.

9. In a compressing machine, a reciprocating head, a mold carried by said head, a top-lift plate and instrumentalities for causing said top-lift plate to be moved relatively to the mold comprising a cam, a cam-operated lever movable with the head and connected to said plate, and means for causing said cam to remain stationary during a part of the downward movement of said head and to move with said head during the remainder of said movement.

10. In a compressing machine, a frame, a die, a reciprocating head, a mold carried by said head, a top-lift plate in but movable relatively to said mold, a power transmitter connected to said top-lift plate, and movable with the head, a cam for operating said power transmitter, and a coacting actuator and stops on the head and cam for causing the cam to move with the head.

11. In a compressing machine, a frame, a die, a reciprocating head, a mold carried by said head, a top-lift plate in but movable relatively to said mold, a power transmitter connected to said top-lift plate and movable with the head, a cam for operating said power transmitter, friction devices for holding said cam against movement, and coacting means on the head and cam by which the cam is caused to move partway with the head.

12. In a compressing machine, a frame, a die, a reciprocating head, a mold carried by said head, a top-lift plate in but movable relatively to said mold, a power transmitter connected to said top-lift plate and movable with the head, a cam for operating said power transmitter, devices for yieldingly holding the cam against movement, separated stops connected to the cam, and an actuator movable with the head and adapted to alternately engage said stops and thereby move said cam first in one direction and then in the other.

13. In a compressing machine, a frame, a die, a reciprocating head, a mold carried by said head, a top-lift plate in but movable relatively to said mold, a power transmitter connected to said top-lift plate and movable with the head, a cam for operating said power transmitter, means on the frame for slidingly attaching the cam thereto, and means for causing said cam to move with the head during the last portion of the upward movement thereof.

14. In a compressing machine, a frame, a die, a reciprocating head, a mold carried by said head, a top-lift plate in but movable relatively to said mold, a power transmitter connected to said top-lift plate and movable with the head, a cam for operating said power transmitter, a slide on the frame to carry the cam, and means for causing said cam to move with the head during the last portion of the downward movement thereof.

15. In a compressing machine, a frame, a die, a reciprocating head, a mold carried by said head, a top-lift plate in but movable relatively to said mold, a power transmitter connected to said top-lift plate and movable with the head, a cam for operating said power-transmitter, a guideway on the frame on which said cam is adapted to slide, means for frictionally holding the cam against movement, an actuator connected to and movable with the head, and stops connected to the cam in position to be engaged by and moved with said head.

16. In a compressing machine, a frame, a die, a reciprocating head, a mold carried by said head, a top-lift plate in but movable relatively to said mold, a power transmitter connected to said top-lift plate and movable with the head, a cam for operating said power-transmitter, and having substantially parallel faces as at $x$ and $z$, and an inclined face, as at $y$, all adapted to be engaged by said power transmitter, means for movably mounting said cam on the frame, and means for moving the cam upwardly with the head, when in the upward movement of the head the power transmitter reaches the face $x$.

17. In a compressing machine, a frame, a die, a reciprocating head, a mold carried by said head, a top-lift plate in but movable relatively to said mold, a power transmitter connected to said top-lift plate and movable with the head, a cam for operating said power transmitter and having substantially parallel faces as at $x$ and $z$, and an inclined face, as at $y$, all adapted to be engaged by said power transmitter, means for movably mounting said cam on the frame, and means for moving the cam downwardly with the head when in the downward movement of the head the power transmitter reaches the face $z$.

18. In a compressing machine, a frame, a die, a reciprocating head, a mold carried by said head, a top-lift plate in but movable relatively to said mold, a power transmitter connected to said top-lift plate and movable with the head, a cam for operating said power transmitter, and means for effecting a relative adjustment of the cam and the power-transmitting device, additional to their relative movement, in lines substantially parallel to the path of movement of the head.

19. In a compressing machine, a top-lift plate having a shank with a peripheral groove, a post having a socket to receive said shank and a longitudinal groove, and a spring arranged in said groove in the post and having its free end bent so as to enter the peripheral groove in the shank, substantially as set forth.

20. In a compressing machine, a frame, a movable head, a mold on said head comprising side dies, slides to which said links and said dies are connected, said slides being formed in detachable sections adapted to be adjusted toward and from each other.

21. In a compressing machine, a frame, a movable head, a mold on said head comprising side dies, slides to which said links and said dies are connected, said slides being formed in detachable sections, interchangeable shims or spacers adapted for insertion between said sections for adjusting said dies relatively to each other, and positive connections between the sections of said slides and passing through said shims.

In testimony whereof I have affixed my signature, in presence of two witnesses.

GEORGE B. GROVER.

Witnesses:
GEO. W. BREED,
HARRIET L. BEAN.